June 29, 1965 H. H. SOBETZER 3,191,335
FISHING LURE RETRIEVER
Filed March 4, 1963
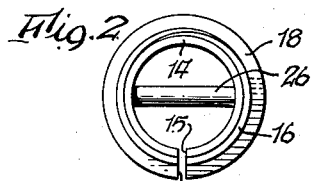
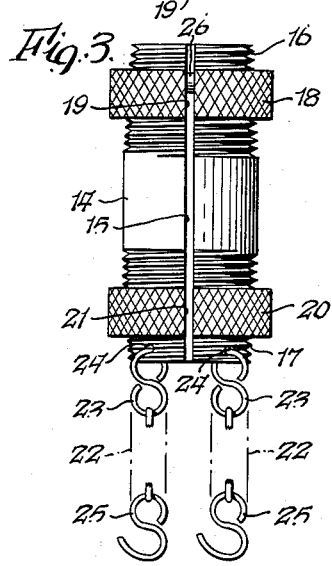
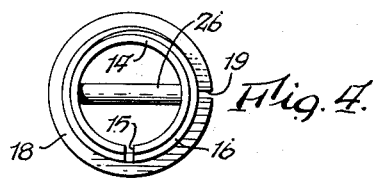
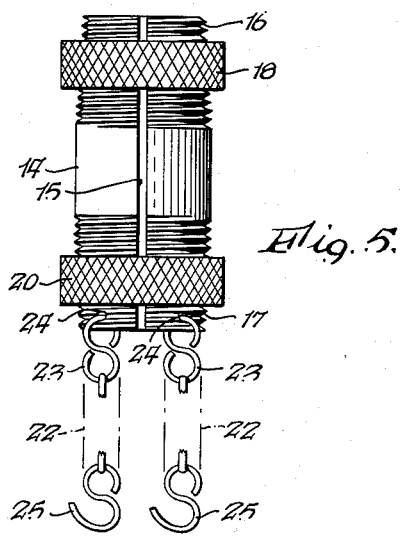
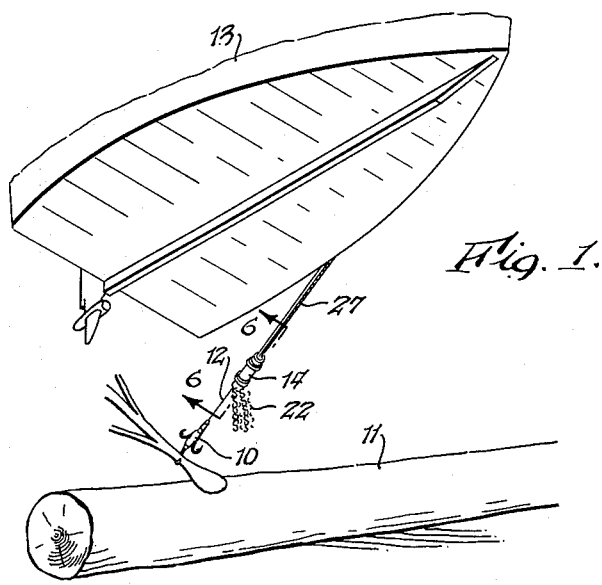
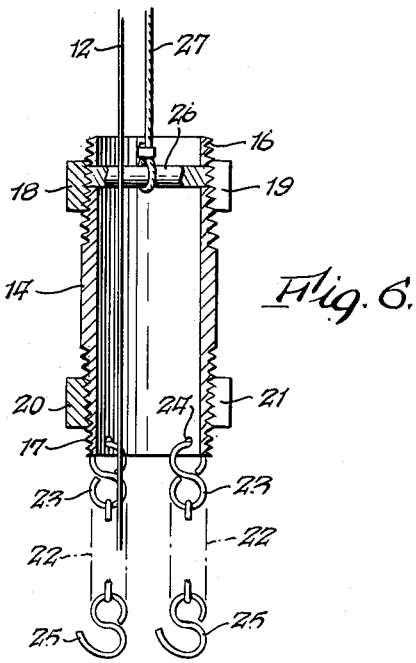
INVENTOR.
HERBERT H. SOBETZER
BY
Popp and Sommer
ATTORNEYS.

United States Patent Office 3,191,335
Patented June 29, 1965

3,191,335
FISHING LURE RETRIEVER
Herbert H. Sobetzer, 4771 Broadway Ave., Depew, N.Y.
Filed Mar. 4, 1963, Ser. No. 262,733
3 Claims. (Cl. 43—17.2)

This invention relates to a device for dislodging fishing lures which may have become hooked onto submerged logs and the like, the device being hereinafter referred to as a fishing lure retriever.

The objects of the invention are to provide a fishing lure retriever of improved and simple construction, which may be readily mounted operatively on the fishing line leading to the snagged lure and locked on such line so that the ensuing jerking on the pull cord for the retriever will not free the retriever from the fishing line.

Other objects and advantages of the present invention will be apparent from the following detailed description of a preferred embodiment shown in the accompanying drawing wherein:

FIG. 1 is a perspective underwater view showing a fishing lure snagged on a submerged log and having a line leading to the overhead fishing boat and showing the retriever of the present invention arranged on such line.

FIG. 2 is a top plan view of the retriever per se and showing the same adjusted for the insertion of a fishing line.

FIG. 3 is a side elevational view thereof.

FIG. 4 is a top plan view of the retriever showing the same adjusted to a locked position.

FIG. 5 is a side elevational view thereof.

FIG. 6 is a vertical central longitudinal view thereof taken on line 6—6 of FIG. 1.

Referring to FIG. 1, the numeral 10 represents a fishing lure of any construction having hooks one of which is shown snagged on the branch of a submerged log 11. The lure 10 is attached to a fishing line 12 which leads upwardly to an overhead boat 13 floating on the surface of the water.

The purpose of the inventive retriever is to dislodge the snagged lure 10.

The retriever per se comprises a tubular body 14 having a longitudinal split 15 in its wall on one side and extending from end to end of the body. The body is also provided with external tapered threads such as pipe threads at opposite ends extending to the end extremities, such threads being indicated at 16 and 17. Each of these external threads 16 and 17 is convergently tapered axially of the body 14 toward the corresponding one of its end extremities. Rotatably arranged on the upper threaded portion 16 is an upper ring 18 which is provided with a longitudinal split 19 in its wall on one side for its full axial length, and is preferably knurled on its peripheral surface to enable easy manipulation. This ring 18 has internal tapered threads which rotatably engage the external threads 16. The lower threaded portion of the body 14 is provided with a similar split ring, the same being indicated at 20, having a longitudinal split 21, being externally knurled and internally provided with tapered threads which engage the threads 17. Each of the internal threads of the split rings 18 and 20 when mounted on the externally threaded end portions of the body 14 is convergently tapered axially of this body toward the corresponding one of its end extremities, as shown in FIG. 6.

As a consequence of the tapered threaded engagement of the rings 18 and 20 on the body 14, it will be seen that rotation of either ring so as to move the same toward the center of the body will tend to tighten the threaded engagement of that ring. The split rings and body also act yieldingly to urge a firm frictional engagement between the engaging threads, thereby preventing unintentional rotation of the rings on the body which might inadvertently realign the splits.

The tubular body is shown as having hanging from its lower end a plurality of flexible ensnaring elements such as chain lengths, these being indicated severally at 22. The uppermost link 23 in each chain length is shown as being hooked through a radial hole 24 provided in the tubular body adjacent its lower end. The lowermost link 25 is shown as having its free end spread open to provide a hook.

The body 14 adjacent its upper end is also provided with means for fastening a pull cord. As shown, such means preferably comprises a transverse bar 26 arranged internally of the tubular body and having its opposite ends received in aligned radial holes provided in opposite wall portions of the tubular body. As shown in FIG. 2, the bar 26 extends transversely of the longitudinal split 15.

Preferably the various elements of the retriever such as the body 14, rings 18 and 20, chains 22 and bar 26 are made of brass to prevent corrosion. The ends of the bar 26 may be brazed to the tubular body 14 before the external threads 16 are formed on this body so that these threads will be cut into the outer ends of this bar.

In use, a pull cord 27 is suitably attached to the bar 26. The various splits 15, 19 and 21 are aligned as shown in FIGS. 2 and 3. When so aligned, the fishing line 12 may be inserted into the interior of the tubular body so as to extend longitudinally therethrough as shown in FIG. 6. Following entry of the line into the body passage, the rings 18 and 20 are manipulatively turned so as to move these rings toward each other and adjustment is made so that they are left with their respective splits 19 and 21 out of alignment with the split 15 in the body, as depicted in FIGS. 4–6.

A feature of the invention is that the tapered threaded engagement between the rings and tubular body is such that as these rings are moved toward each other the threaded engagement tightens. This is a biased tightening because of the inherent springiness in the split rings as well as in the split body. The combination of the split elements and the tapered threaded engagement insures against undesired loosening of the rings 18 and 20 upon the body 14 which might otherwise be occasioned by the jerking and jiggling due to manipulation of the pull cord 27.

When the retriever has been threaded and locked upon the fishing line 12, the retriever is allowed to descend by gravity to the lure 10. When lowered as far as it will go, the retriever is then jerked and jiggled by manipulating the pull cord 27. This haphazard action sooner or later ensnares one or more of the chain lengths 22 with the hooks of the lure so that when such ensnarement is effected the cord 27 can be pulled to free the lure either by breaking it free or bending its snagged hook.

Another feature of the inventive retriever is that the pull cord 27 is attached directly to the body 14 rather than indirectly as would be the case if it were fastened to one of the rings 18 or 20. In accordance with the inventive construction substantial pull forces can be applied via the cord 27 directly to the body in an effort to free a snagged lure with which the chain lengths 22 may be interlocked.

From the foregoing it will be seen that the present invention achieves the various objects stated. Since the embodiment shown is illustrative and not limitative of the present invention, the scope is to be measured by the appended claims.

What is claimed is:

1. A fishing lure retriever, comprising a longitudinally split tubular body having external threads at opposite ends extending to the end extremities, each of said external threads being convergently tapered axially of said body toward the corresponding one of said end extremities, first and second longitudinally split rings having internal threads rotatably arranged on opposite threaded end portions of said body, each of said internal threads being convergently tapered axially of said body toward the corresponding one of said end extremities, a bar extending transversely of said body adjacent one end thereof and secured at its opposite ends to said body, said bar being adapted to have a pull cord attached thereto, and a plurality of flexible ensnaring elements attached to said body adjacent the end thereof remote from said one end.

2. In a fishing lure retriever, the combination comprising a longitudinally split tubular body having external threads at opposite ends extending to the end extremities, each of said external threads being convergently tapered axially of said body toward the corresponding one of said end extremities, a first longitudinally split ring having internal threads engaging said threads at one of said ends, and a second longitudinally split ring having internal threads engaging said threads at the other of said ends, each of said internal threads being convergently tapered axially of said body toward the corresponding one of said end extremities.

3. In a fishing lure retriever, the combination comprising a longitudinally split tubular body having external threads at opposite ends extending to the end extremities, each of said external threads being convergently tapered axially of said body toward the corresponding one of said end extremities, first and second longitudinally split, internally threaded rings rotatably arranged on the opposite threaded end portions of said body, the internal threads of each of said rings being convergently tapered axially of said body toward the corresponding one of said end extremities, and means for fastening a pull cord to said body including a bar extending transversely of said body internally thereof and secured at its opposite ends thereto.

References Cited by the Examiner
UNITED STATES PATENTS

| | | | |
|---|---|---|---|
| 1,443,041 | 1/23 | Richmond. | |
| 2,385,415 | 9/45 | Jackson | 43—17.2 |
| 2,482,037 | 9/49 | Swaim | 43—17.2 |
| 2,627,691 | 2/53 | Bress | 43—17.2 |
| 2,651,132 | 9/53 | Lennen | 43—17.2 |
| 2,760,810 | 8/56 | Smith. | |
| 2,793,457 | 5/57 | Gaynes | 43—17.2 |

SAMUEL KOREN, *Primary Examiner.*